United States Patent
Gaborski et al.

[11] Patent Number: 5,857,030
[45] Date of Patent: Jan. 5, 1999

[54] AUTOMATED METHOD AND SYSTEM FOR DIGITAL IMAGE PROCESSING OF RADIOLOGIC IMAGES UTILIZING ARTIFICIAL NEURAL NETWORKS

[75] Inventors: Roger Stephen Gaborski, Pittsford; Yuan-Ming Fleming Lure, Pittsford; Thaddeus Francis Pawlicki, Rochester, all of N.Y.

[73] Assignee: Eastman Kodak Company, Rochester, N.Y.

[21] Appl. No.: 629,694

[22] Filed: Apr. 9, 1996

[51] Int. Cl.⁶ ........................................... G06K 9/80
[52] U.S. Cl. .......................... 382/132; 382/156; 382/173; 382/257; 378/37
[58] Field of Search ..................... 382/224, 132, 382/128, 171, 294, 257, 130, 156, 173; 378/37

[56] References Cited

U.S. PATENT DOCUMENTS

| | | | |
|---|---|---|---|
| 5,260,871 | 11/1993 | Goldberg | 600/320 |
| 5,365,429 | 11/1994 | Carman | 378/37 |
| 5,491,627 | 2/1996 | Zhang et al. | 600/408 |
| 5,586,160 | 12/1996 | Mascio | 378/37 |
| 5,621,645 | 4/1997 | Brady | 340/903 |
| 5,666,434 | 9/1997 | Nishikawa et al. | 382/128 |

OTHER PUBLICATIONS

Chan et al. "Digital Characterization of Clinical Mammographic Microcalcifications: Applications in Computer-Aided Detection." SPIE, vol. 914, Medical Imaging II, pp. 591–593, 1988.

Pereira et al. "Detection and Characterization of Microcalifications in Mammographic Images." Proceedings of 38th Midwest Symposium on Circuits and Systems, vol .2, pp. 1369–1372, Aug. 1995.

Petrick et al. "An Adaptive Density–Weighted Contrast Enhancement Filter for Mammographic Breast Mass Detection." IEEE Transactions on Medicl Imaging, vol. 15, No. 1, pp. 59–67, Feb. 1996.

*Primary Examiner*—Jon Chang
*Attorney, Agent, or Firm*—William F. Noval

[57] ABSTRACT

An automated method and system for digital imaging processing of radiologic images, wherein digital image data is acquired and subjected to multiple phases of digital imaging processing. During the Pre-Processing stage, simultaneous box-rim filtering and k-nearest neighbor processing and subsequent global thresholding are performed on the image data to enhance object-to-background contrast, merge subclusters and determine gray scale thresholds for further processing. Next, during the Preliminary Selection phase, body part segmentation, morphological erosion processing, connected component analysis and image block segmentation occurs to subtract unwanted image data preliminarily identify potentials areas including abnormalities. During the Pattern Classification phase, feature patterns are developed for each area of interest, a supervised, back propagation neural network is trained, a feed forward neural network is developed and employed to detect true and several false positive categories, and two types of pruned neural networks are utilized in connection with a heuristic decision tree to finally determine whether the regions of interest are abnormalities or false positives.

7 Claims, 8 Drawing Sheets

PIXEL VALUE USED AS FEATURE MAP

AUTOMATED METHOD AND SYSTEM FOR DIGITAL IMAGE PROCESSING OF RADIOLOGIC IMAGES UTILIZING ARTIFICIAL NEURAL NETWORKS

TECHNICAL FIELD

The present invention relates to an automated method and system for digital imaging processing of radiologic images, and more specifically, to an automated method and system for digital imaging processing of mammograms utilizing artificial neural networks for detection of microcalcification clusters.

BACKGROUND OF THE INVENTION

Breast cancer is the leading cause of death in women. Early detection, diagnosis and treatment of such cancer, however, can significantly improve the chances of survival of breast cancer patients. To date, x-ray mammography is the only proven diagnostic procedure capable of detecting early-stage, clinically occult breast cancers. Currently, the American Cancer Society recommends the use of mammography for asymptomatic screening of women over the age of 40, with annual mammography recommended for women over 50 years of age.

Cancer is detected indirectly utilizing mammography by identifying clusters of microcalcifications in the tissue of the diseased breast indicated by bright spots in the mammographic image. Indeed, subtle microcalcifications are typically the earliest, and sometimes the sole, radiographic indication of early breast cancer. Approximately half of all breast carcinomas exhibit such clusters of microcalcification in mammography images and up to 80% exhibit the clusters upon microscopic inspection. Thus, the early and accurate detection of such clusters is critical to diagnosis and early treatment of breast cancer patients.

Traditionally, mammography readings have been performed by radiologists using unaided visual inspection. The accuracy, inconsistency, speed and cost of such inspection, however, have limited the success rate of early detection utilizing this screening method. Additionally, the relatively small size and limited visibility of small, and thus early, microcalcifications prevent even the most experienced radiologists from detecting their presence. Moreover, with the education of women for the need for screening mammography, there has been an explosion in the number of mammograms performed each year. Accordingly, there have been efforts to develop automated screening of mammograms, such as computer-aided systems for detecting abnormal anatomical regions in digital medical images.

One such prior art method includes computation of filtered second spatial derivatives of intensity values of image pixels, preserving locations of zero-crossings in the filtered image, and evaluation of suspect conceptual feature measures. However, this method is particularly susceptible to errors caused by the high level of image noise accompanying most radiological images, resulting in a high number of false positives. Additionally, since microcalcifications are typically very small and irregularly shaped, a conceptual feature measure may not accurately and completely represent the actual nature of the microcalcification. Finally, the predetermined threshold values (i.e., a winner-take-all strategy) for each feature measure inherently limits the success of this method.

Thus a need remains for an automated method and system for digital imaging processing of radiologic images to detect the early presence of microcalcification clusters wherein the high spatial-frequency, small size and irregular shape of the clusters will be accurately and consistently detected.

SUMMARY OF THE INVENTION

The automated method and system of digital imaging processing of the present invention overcomes the foregoing and other problems associated with the prior art by utilizing multiple steps of digital imaging processing to eliminate false positives prior to final classification of suspect regions using neural networks, thus maximizing detection of true microcalcifications within the radiologic image.

Once image data is acquired from a radiologic image, the data is subjected to multiple phases of digital image processing to initially identify one or more suspect regions. First, during the Pre-Processing phase, object-to-background contrast of the data is enhanced using box-rim filtering, k-nearest neighbor processing and global thresholding. Next, during the Preliminary Selection phase, the data is subjected to body part segmentation, morphological erosion, connected component analysis, and segmentation of suspect object blocks to preliminarily select microcalcification candidates. And in the final digital imaging phase, Pattern Classification, the data is further analyzed using feature map generation, neural network classification and neural net binary tree decision making to achieve accurate identification of microcalcification(s). Use of these multiple phases eliminates a high number of false positives experienced by prior art methods.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
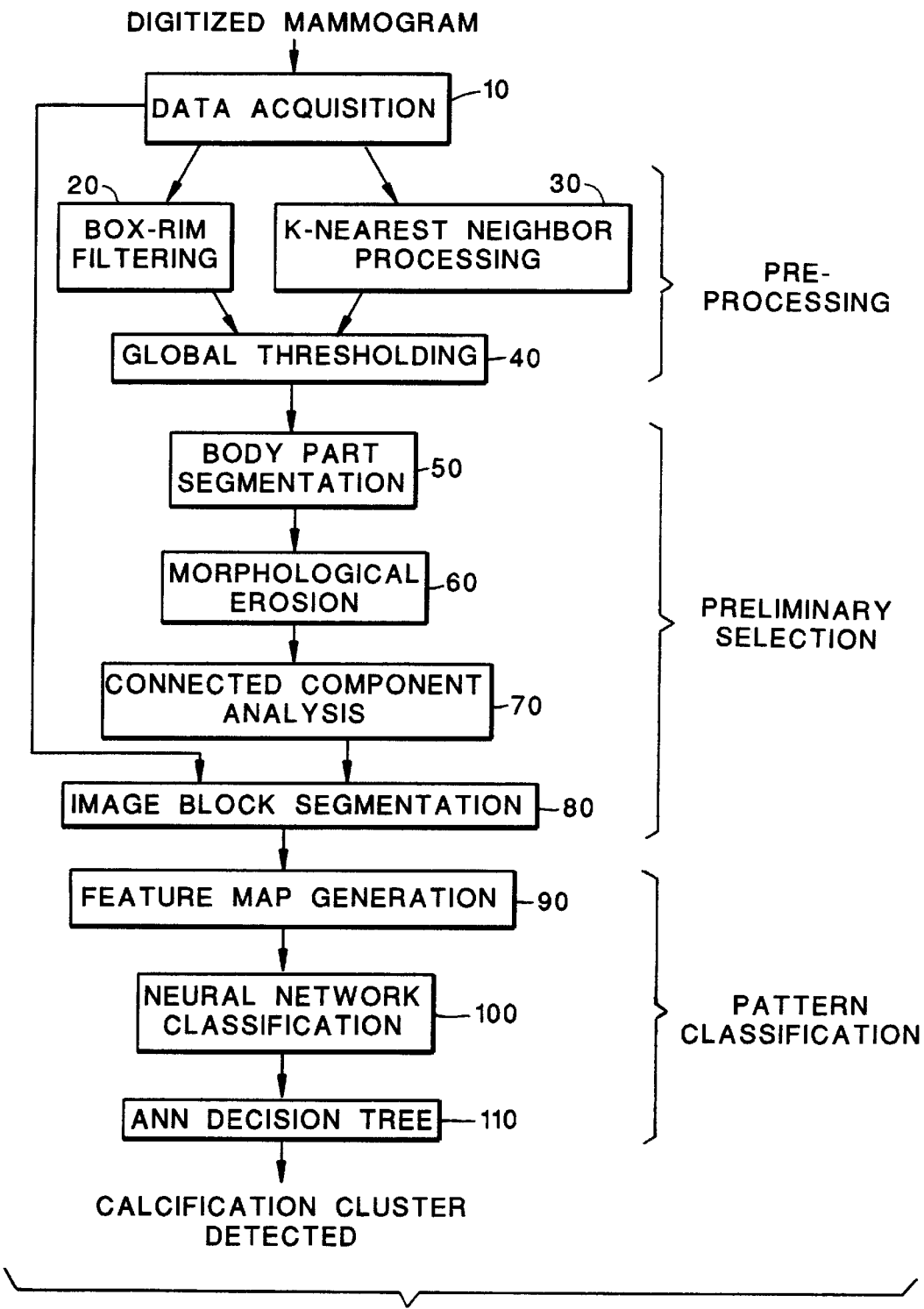
FIG. 1 is a schematic diagram of the method of the present invention.

Referring to FIG. 1, there is shown a schematic diagram of the automated method and system of the present invention. The automated method and system of the present invention includes three broad phases. In the first phase, the Pre-Processing Phase, box-rim filtering, k-nearest neighbor processing and global thresholding are performed on the image data to enhance object-to-background contrast, merge subclusters and determine gray scale thresholds for further processing. Next, during the Preliminary Selection phase, body part segmentation, morphological erosion processing, connected component analysis and image block segmentation occurs to subtract unwanted image data preliminarily identify potentials areas including abnormalities. Finally, during the Pattern Classification phase, feature patterns are developed for each area of interest, a supervised, back propagation neural network is trained, a feed forward neural network is developed and employed to detect true and several false positive categories, two types of pruned neural networks are utilized in connection with a heuristic decision tree to finally determine whether the regions of interest are abnormalities or false positives.

Data Acquisition

First, data is acquired from a digitized mammogram (step 10). While digital mammograms are becoming more readily available, typically mammograms are obtained with film-screen (x-ray) technology. In the event an x-ray film is presented for automated processing, a digitized mammogram image is acquired by digitizing clinical x-ray mammogram films or through use of a Computer Radiography (CR) system. Digital mammography images possessing pixels in approximately the 100–50 m resolution range and having 4096 gray scale levels are appropriate for use with the automated method and system of the present invention and are routinely obtained using the foregoing techniques.

Box-Rim Filtering

Figure 2:
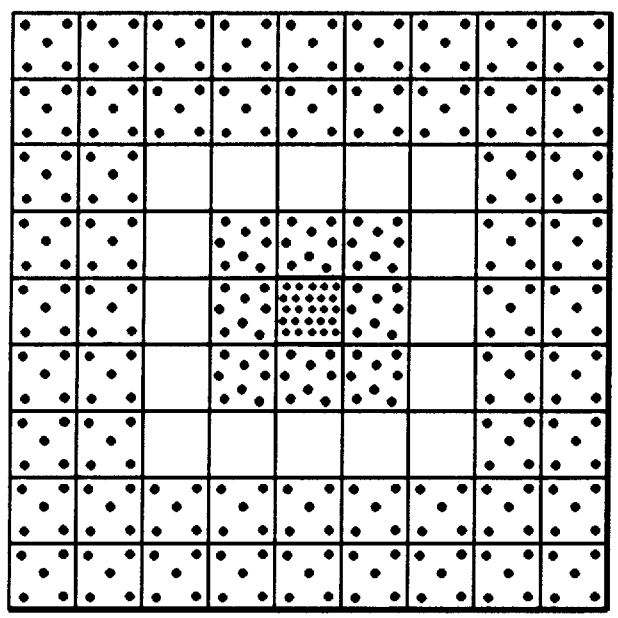
FIG. 2 is an illustration of the 9×9 box-rim template used in the Pre-Processing phase of the automated method and system of the present invention.

The image data acquired is simultaneously filtered using box-rim filtering (step 20) and processed using a k-nearest neighbor algorithm (step 30). As illustrated in FIG. 2, box-rim filtering is accomplished by applying a 9×9 spatial template to the entire image to enhance object-to-background contrast. The box rim has the approximate shape of a Mexican hat with response coefficients gradually reduced from 1.0 in the center of the box to –0.125 in the boundary rim. This filtering technique is based on a differential enhancement technique which subtracts a background enhanced image (obtained from a 2-pixel wide rim filter) from a signal enhanced image (obtained through a 3×3 match filtering). Since the sum of all coefficients remains a constant ("1") across the box-rim template, the overall energy of the image remains constant.

K-Nearest Neighbor Processing

Simultaneously, a k-nearest neighbor algorithm is employed for enhancement and selection of any microcalcification candidates (step 30). This step is carried out in two stages. In the first stage, pregrouping of data is made to obtain sub-clusters. Next, the subclusters grouped in the initial stage are merged hierarchically utilizing a similarity measure. Window sizes ranging from 5×5 up to 70×70 are utilized for the evaluation of these subclusters. The values of k are also adjusted during this stage of processing. As the name suggests, a set of k nearest neighbors of the sample pixel are first determined. Next, the Euclidean distance measure is determined and evaluated. Finally, the sample pixel is subordinated to every one of its neighbors in this set and the subclusters are detected, counted and merged for further processing.

Global Thresholding

Once box-rim filtering and k-nearest neighbor processing is completed and the subclusters are merged, global thresholding is then applied to the filtered image such that pixels with gray scale values among the top 5% of a histogram of the entire image are preserved (step 40). This processing step first calculates the histogram of the entire image. Additionally, a cumulative density function (cdf) ranging from 0% to 100% is determined. Finally, a gray scale threshold value is calculated above which the cdf is within the top 5%. The arbitrary value of 5% is chosen to ensure the inclusion of all true microcalcifications in the resultant image.

Body Part Segmentation

During the next phase of the digital imaging processing, referred to as the Preliminary Selection phase, body part segmentation is applied to the data to identify the breast region (step 50). This technique is more fully described in U.S. Pat. No. 5,268,967 to Jang et al. and is used to eliminate any potential for false detection outside the subject body part, the breast in this case.

According to this technique, the original image is first down-sampled by 9 pixels. The histogram of the original sub-sampled image is first computed as well as a first gray scale value separating the breast region of the image from the background region(s). These values are determined using the bimodel histogram distribution typically occurring in mammogram images.

Morphological Erosion Processing

A morphological erosion technique is then applied to the sub-sampled image iteratively in order to identify one or more distinct pixels (seeds) indicative of different body part regions within the image (step 60). Using these seeds as starting points, a region growing is performed circumferentially outward from the seed(s) until the growing region encounters a pixel exhibiting a gray scale value less than the first gray scale value initially determined to define different anatomical regions in the image. The largest region is then captured and up-sampled by 9 pixels and identified by masking as the breast region of the original mammogram image.

A rectangular spatial template is applied next to the masked image to erode the breast region identified previously to exclude boundary data. Data from the boundary of the breast region is removed to prevent high false positives due to digitization artifice as well as skin line noise. The size of the spatial template utilized is chosen to be a multiplier of nine (9) to account for any numerical inaccuracy generated due to the rectangular shape of the 9×9 spatial template used in box-rim filtering (step 20) and the relative position of the breast in two or more views in the mammogram. In other words an 18×27 template is used for a cranio-caudal view. Similarly, a 27×18 template is used for an oblique view. This morphological erosion technique is performed to eliminate boundary pixels with a portion of their connected pixels unmarked.

Connected Component Analysis

During the step 70, a 4-point connected component analysis technique is performed on those pixels remaining after segmentation and erosion processing. This step examines the connectivity between a pixel and its four immediate neighbor pixels to rule out isolated points. In other words, only regions where at least a subject pixel and its four neighbors are suspect are of interest. Specifically, the four neighbor pixels lie above, below, to the right, and to the left of the subject pixel. During this analysis, pixels having less than four suspect pixels directly connected to it are removed. If, however, the four neighboring pixels are also suspect, their locations are recorded as suspect microcalcification candidates.

Image Block Segmentation

Now that suspect microcalcification candidates have been identified, they are subjected to additional digital imaging processing to further determine the likelihood that the candidates are indeed true microcalcifications. Accordingly, image block segmentation is performed in step 80. Pursuant to this step, the original image from step 10 is segmented into smaller image blocks, typically 32×32 pixels, or approximately 3.2 mm$^2$ area, centered at the suspect candidate regions. This segmentation results in image blocks suitable for feature extraction and neural network classification.

In the next phase of digital imaging processing, the Pattern Classification Phase, feature map generation, neural network classification and neural net binary tree decision is performed.

Feature Map Generation

In the feature map generation step (step 90) of the present invention, sets of radially-sampled pixels are used as feature patterns. The use of radially-sampled pixels in the method and system of the present invention is in stark contrast to prior art methods utilizing entire image blocks (32×32 in this case) or derived conceptual feature parameters such as contrast, standard deviation, etc. Use of radially-sampled pixels greatly simplifies development of neural network architecture in later processing steps, avoiding the lengthy training time, insufficient training samples, incomplete feature parameter sets, etc., associated with traditional methods.

Figure 3:
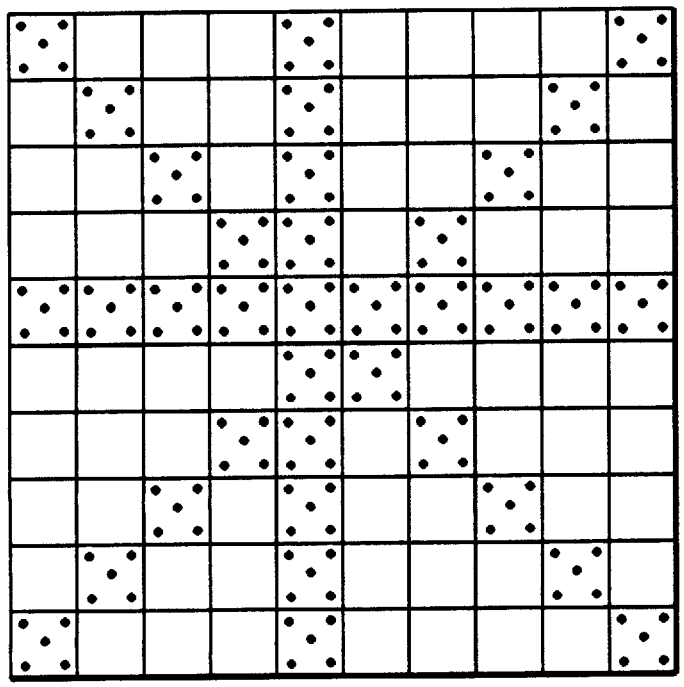
FIG. 3 is an illustration of radially-sampled pixels according to the automated method and system of the present invention.
Figure 3:

During this step, the image block is first standardized. This is accomplished by calculating mean and standard deviation pixel values for each image block (32×32), subtracting each pixel value from the mean, and dividing the result by its standard deviation. The result is the retention of subtle variations in microcalcification candidate and background region structure. As illustrated in FIG. 3, a standard 10×10 binary mask is applied to the standardized image to obtain gray scale values along equally oriented radii (45 apart) centered at the largest pixel. Although not impossible, it is very rare that two microcalcifications would appear in a single 10×10 image area. The pixel with the largest gray scale value is always in the center region of the 32×32 image block with a maximum shift of 2 pixels. Values along four radial directions are then scanned to a form feature pattern set for each of the suspect candidates. By using smaller regions of interest and radially-sampled data, essential structural characteristics of the subject anatomical region are preserved in the pattern sets while substantially reducing the number of total samples for each suspect candidate to only 40 points.

Neural Network Classification

For training and development of a neural network classifier and decision maker, five categories within a breast region are determined in step 100: (1) true microcalcifications; (2) bright solitary dots; (3) medium solitary dots; (4) bright fat tissue; and (5) medium fat tissue. The latter four categories are all false positive structures to be weeded out during classification. Granular noise is primarily responsible for categories (2) and (3).

Next, approximately one-fifth of the suspect candidates previously identified are randomly selected and combined to form a training sample for a neural network classifier. Approximately one-third of the training sample will be true microcalcifications. True microcalcification clusters exhibit a characteristic Gausian-shape distribution profile along a certain direction. The profiles of solitary dots (categories (2) and (3)) are more narrow when compared to the profile of a true microcalcification. A relative smooth and flat profile is typically exhibited by fatty tissues (categories (4) and (5)).

The desired target value for each category is assigned either a "1", indicating that the profile matches that category or a "0", indicating that the profile does not match that category. Optimum training results for the neural network are obtained by using a vector with five elements associated with each feature pattern and orthogonal vectors for each of the five categories.

Figure 4:
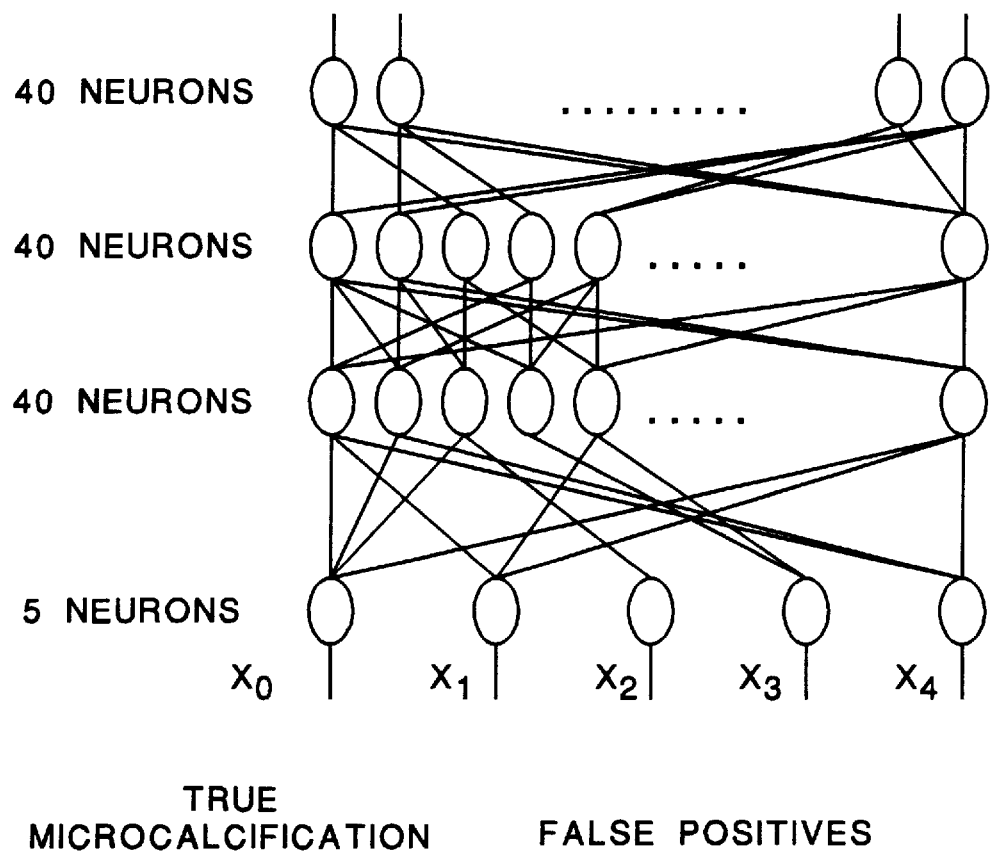
FIG. 4 is an illustration of an architecture of a back-propagation trained feed forward neural network classifier used in the automated method and system of the present invention.

As illustrated in FIG. 4, a supervised, back-propagation trained feed-forward neural network including four processing layers is developed to perform the pattern classification function of the present invention automated method and system. The input layer consists of 40 neurons corresponding to pixel values at pattern sets for each suspect candidate. Each of two hidden layers contain 40 neurons. The number of hidden neurons is determined experimentally within the range of 10 to 120 neurons, using 5 neuron increments. A five neuron layer is used to classify each suspect candidate submitted as either a true microcalcification or one of the four false positive categories previously described. The back propagation learning algorithm is employed to train this network. A sigmoidal transfer function, changing gradually from 0 to 1, with a gain factor of 1, is utilized as an activation function in each neuron. Initial weights are randomized in the range of –8 to 8 and then adapted or modified based upon error between desired and computed values. If the error between the desired and computed values exceeds 30%, adaptation occurs. In one test, it took 300 iterations for the network to learn up to a 98% accuracy with a test training sample.

After training of the neural network is complete, actual data sets are then applied to the network to generate analog output values ranging from 0 to 1 at each neuron, representing the probability of the occurrence of each suspect candidate.

ANN Decision Tree

Instead of using a "winner-take-all" strategy to determine final classification of the suspect candidates, a heuristic decision rule is created to facilitate classification in step 110. Additionally, a binary decision tree processing element optimized with a pruned neural network learning algorithm is developed to maximize the detection of true microcalcifications by eliminating suspect candidates with a high probability of being a false positive.

The heuristic rule developed for the present invention may be defined as follows:

if $x_0 > T1$ then C1
else if $x_0 > x_i$ & $x_0 > x_2$ & $x0 > x3$ & $x0 > y4$ then C1
else if $(x_0-x_1)/x_0 < T_2$ & $(x_0-x_2)/x_0 < T_2$ & $(x_0-x_3)/x_0 < T_2$ & $(x_0-x_4)/x_0 > T_2$ then C1
else if $x_1 < T_3$ & $x_2 < T_3$ & $x_3 < T_3$ & $x_4 < T_4$ then C1
else C2
where
 $x_i$ (I=0,1,2,3,4 and 5) are the output from the previous back propagation neural net,
 $T_j$ (j=1,2 and 3) are the thresholds, and
 C1 represents the false positives and C2 represents true positives.

This heuristic rule follows the following logic pattern:
(1) the feature pattern is decided to be a true microcalcification if:
   (a) the output value from the first neuron is greater than a first threshold;
   (b) the output value is greater than the remaining output values;
   (c) the difference between the output value and the remaining output values is less than a second threshold; or
   (d) the remaining output values are less than a third threshold; and
(2) if none of the above apply, the suspect candidate determined to be a false positive.

All the higher order (i.e., >2) or non-linear polynomials derived from the above-described heuristic rule are reduced to a linear function by assigning each higher-order or non-linear variable with a new variable. Thus, a linear operation, denoted as $u_i$, can be utilized in each node as follows:

$$u_0 = x_0 - T_1$$
$$u_1 = x_0 - x_1$$
$$u_2 = x_0 - x_1$$
$$u_3 = x_0 - x_3$$
$$u_4 = x_0 - x_4$$
$$u_5 = (T_2 - 1) \cdot x_0 - x_1$$
$$u_6 = (T_2 - 1) \cdot x_0 - x_2$$
$$u_7 = (T_2 - 1) \cdot x_0 - x_3$$
$$u_8 = (T_2 - 1) \cdot x_0 - x_1$$
$$u_9 = T_3 - x_1$$
$$u_{10} = T_3 - x_2$$
$$u_{11} = T_3 - x_3$$
$$u_{12} = T_3 - x_4$$

Figure 5:
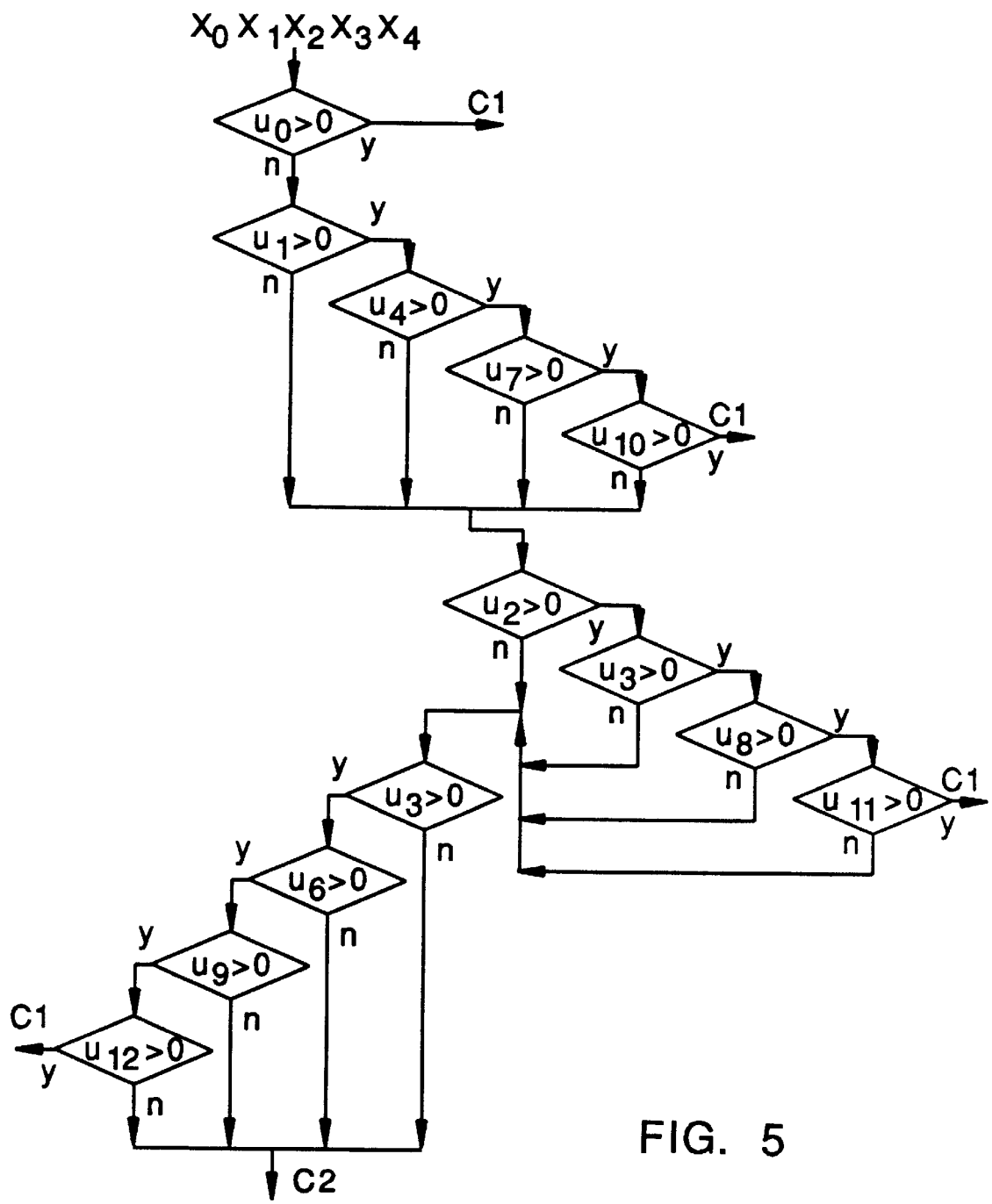
FIG. 5 is an illustration of the binary decision tree for a corresponding heuristic rule.

The binary decision tree processing involves two major processing components: (1) linear operation inside each node; and (2) branching operation between different nodes. As illustrated in FIG. 5, wherein $u_i$ denotes linear operation (functions of thresholds $T_j$) in the ith node, " " denotes branching operation, and four C1s and one C2 denote the five classifications in the five terminals, each terminal of the tree possesses a possible detection classes, four C1s for the four false positive classifications and one C2 for the true microcalcification class. Collection of the detection classes at various terminal points provides the final detection results.

Neural Network Implementation

The decision maker previously described in step 110 can be implemented and optimized via two separate pruned neural network architectures. The connections reflecting the operation inside a decision node as well as the branching in the binary decision tree are not fully connected. A hard limiter with binary output of 0 or 1 is utilized in each neuron. Although soft nonlinearities such as a sigmoidal function provide much better generalization compared with the relay type of hard linearities, a hard limiter performs similarly to the decision tree and is therefore more appropriate in the automated method and system of the present invention.

Semi-Trainable ANN Implementation

Figure 6:
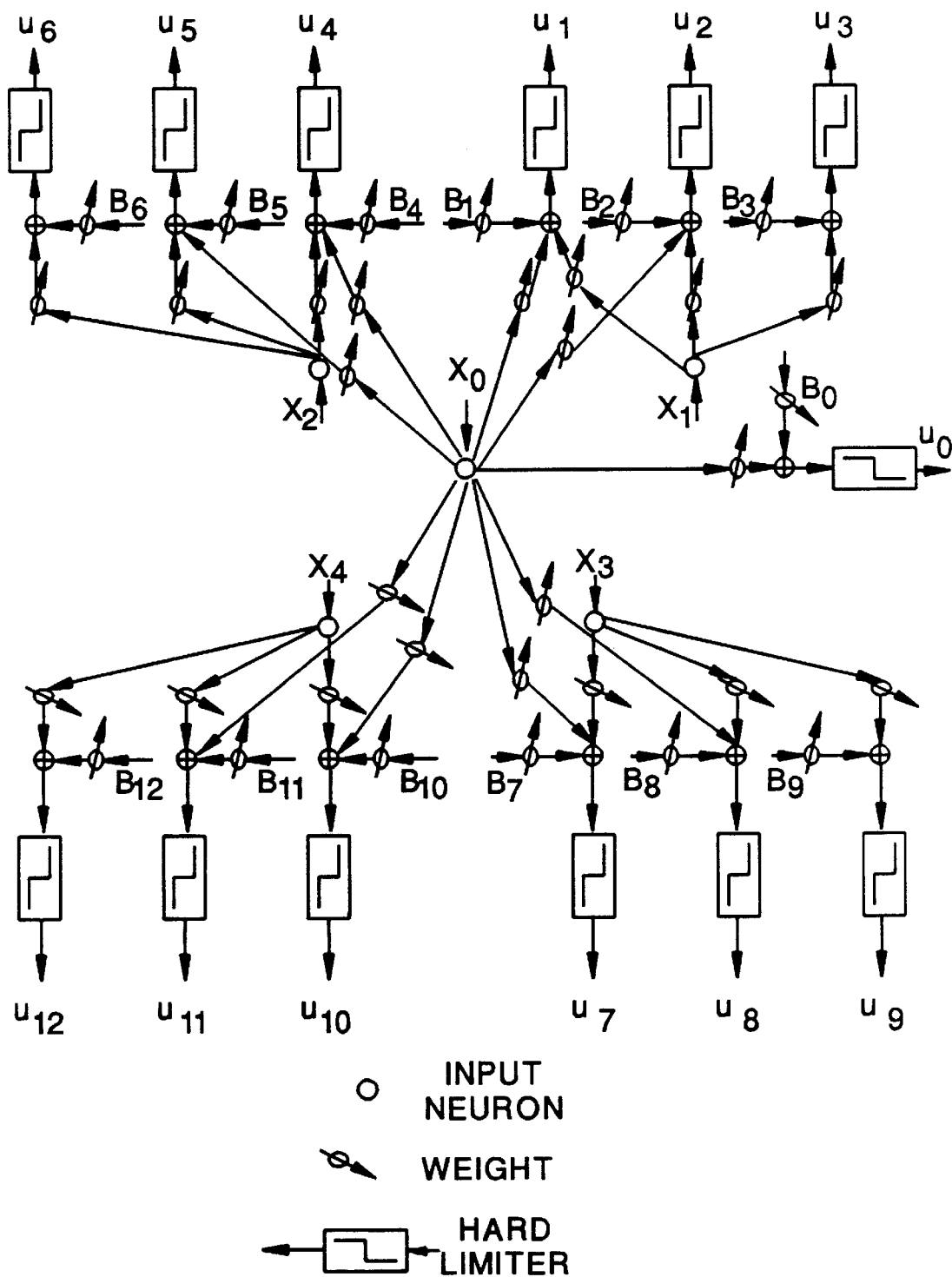
FIG. 6 is an illustration of the implementation of node operations in a decision tree with pruned neural network and initial weights.
Figure 7:
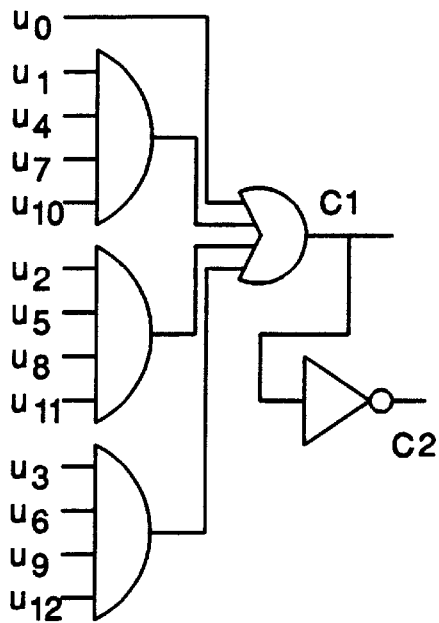
FIG. 7 is a logic circuit illustrating the implementation of a branching operation in a binary decision tree.

The first neural network implemented is a semi-trainable pruned network including two processing elements. As shown in FIG. 6, the first processing element performs the thresholding operation mapping in each node, while the second processing element carries out the logical operations which allows for the conversion of hierarchial branching procedure to a fully parallel process (FIG. 7). Referring again to FIG. 6, the input layer of the first processing element consists of five (5) neurons taking output values (x) from the previously described back propagation neural network. Thirteen (13) hidden neurons are used to represent the total number of nodes (condition statements) in the decision tree. The initial weight values used in the weight matrix are determined from the coefficients of linear inequality functions ($u_j$>0) previously described. Each neuron in the second layer has a bias ($B_i$) with input of value 1. The weight between bias and neuron is obtained from the constant part or zero order of linear functions ($u_j$). Since the conditioning statements do not necessarily include all input variables, the connections between unused input variables and hidden neurons (nodes) are pruned during the entire training process.

The logic circuit illustrated in FIG. 7 is developed based upon the minimization of Boolen algebra and Karnaugh map analysis. The logic circuit operator takes thirteen (13) different binary outputs ($u_i$) from the previous neuron, performs simple logic operations such as AND(·) or OR(+), and generates a final decision (true microcalcification (C2) or false positive (C1)). The logical operations, such as AND, OR and NOT, are fixed (not trainable) once they are determined and only the weights between five (5) inputs and thirteen (13) hidden neurons can be adjusted in the first processing element. A back propagation learning algorithm is also employed during the training procedure.

Fully-Trainable ANN Implementation

The second neural network implementation and optimization of the binary decision tree involves a fully-trainable multi-layer network. The input layer includes five (5) neurons, two (2) hidden layers having thirteen (13) neurons and five (5) neurons, and an output layer having two (2) neurons. The number of neurons in the first hidden layer is also determined based upon node operations, as previously described (FIG. 6). The second hidden layer consists of five (5) neurons to perform AND operations corresponding to the five possible terminals (FIG. 5). The output layer consists of two (2) neurons to perform the OR operations corresponding to either a true microcalcification or a false positive.

Figure 8:
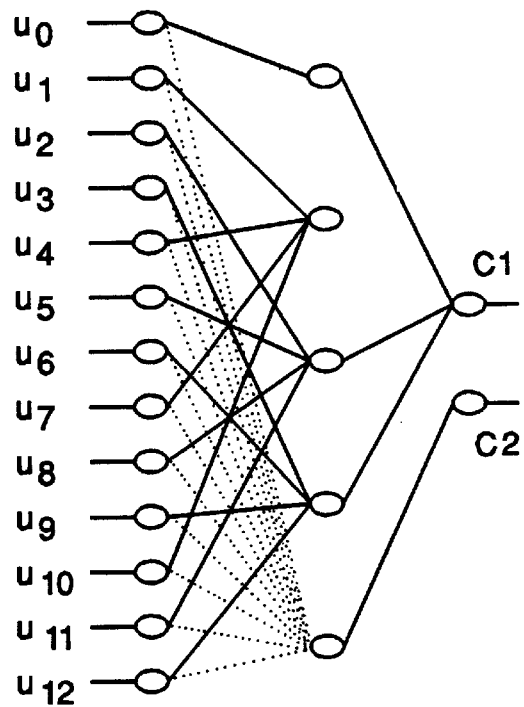
FIG. 8 illustrates implementation of branching operations in a decision tree with pruned neural network architecture and initial weights.

As illustrated in FIG. 8, connections between the input and the first hidden layer represent the node operations and connections between the first hidden layer (13 neurons) and the output layer (2 neurons) represent the branching operations in the binary decision tree. A pruned neural network architecture is also utilized in implementation of this network since each node operation may not include all variables and each branching may not involve travel through all the nodes. The initial weight elements are determined from the heuristic thresholds used in the binary decision tree. Subsection (a) of Appendix A illustrates an example of such initial weights. A supervised back propagation learning algorithm is then used to modify these weights in order to arrive at an optimal decision based upon training. Subsection (b) of Appendix A illustrates the matrix after training has occurred.

SYSTEM

Figure 9:
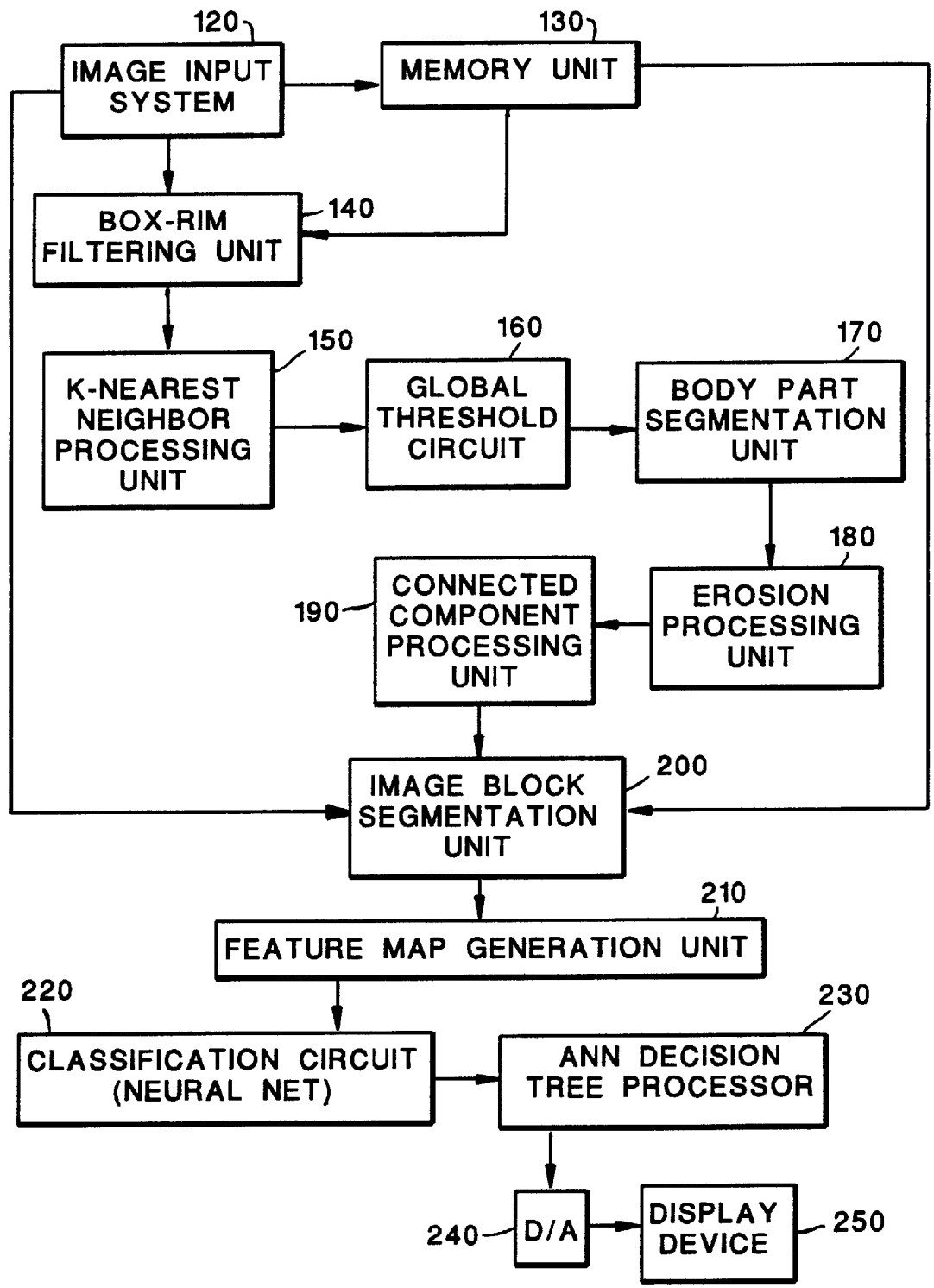
FIG. 9 illustrates a system for implementing the method of the present invention.

Referring to FIG. 9, a schematic block diagram illustrating a system for implementing the method of the present invention, image data of the anatomical region of interest (e.g., a breast) is entered into the image input system 120. For example, such data is provided by a video camera or a film digitizer. The data in the image input system 120 is stored for later retrieval and use in the memory unit 130. Any suitable memory unit device, such as magnetic tape, computer disk, optical laser storage device, etc., can be utilized.

Image data is directed simultaneously to the box-rim filtering unit 140 and k-nearest neighbor 150 processing unit to filter and enhance the image data for further processing. Next, the data is subjected to the global threshold circuit 160, where a histogram of the entire image is produced and certain gray scale values are preserved for further processing. The preserved image data is next sent to the body part segmentation unit 170, where the original image is downsampled, a histogram is produced, and, using gray scale values, the general anatomical region of interest (e.g., breast) is separated from any background material. Subsequently, data is sent to the erosion processing unit 180, where extraneous morphology is subtracted from the image data, leaving only the anatomical region of interest for further processing.

Connected component analysis is conducted in the connected component processing unit 190. Here, pixels are examined in connection with their neighboring pixels to determine the size of the suspect area. In the image block segmentation unit 200, the data is further processed by defining small blocks (32×32 pixels) centered on suspect pixels. This unit produces image blocks suitable for feature extraction and neural network classification.

Image data from the image input system 120 and/or the memory unit 130 is provided to the feature map generation unit 210 along with the processed image data from the image block segmentation unit 200. The feature map generation unit 210 determines sets of radially-sampled pixels used as feature patterns. These feature patterns are subjected to the classification circuit 220. In the classification circuit 220, neural networks are utilized to determine whether suspect candidates identified above are true areas of abnormality, such as a microcalcification cluster. The ANN decision tree processor 230 uses a heuristic rule to assist in the final classification of the suspect candidates. A suspect candidate is ultimately determined to be either one of four false positive classifications or a true abnormality. After passing through digital to analog converter 240, the results are displayed on a display device 250 such as a monitor, a printer, plotter, chart recorder, or the like.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

APPENDIX A (a)
INPUT (5 NEURONS)-HIDDEN 1 (13 NEURONS)

| X0 | X1 | X2 | X3 | X4 | BIAS |
|---|---|---|---|---|---|
| 1.0000 | #.#### | #.#### | #.#### | #.#### | −0.5000 |
| 1.0000 | −1.0000 | #.#### | #.#### | #.#### | #.#### |
| −0.9000 | 1.0000 | #.#### | #.#### | #.#### | #.#### |
| #.#### | −1.0000 | #.#### | #.#### | #.#### | 0.5000 |
| 1.0000 | #.#### | −1.0000 | #.#### | #.#### | #.#### |
| −0.9000 | #.#### | 1.000 | #.#### | #.#### | #.#### #.#### |
| #.#### | #.#### | −1.000 | #.#### | #.#### | 0.5000 |
| 1.000 | #.#### | #.#### | −1.000 | #.#### | #.#### |
| −0.9000 | #.#### | #.#### | 1.000 | #.#### | #.#### |
| #.#### | #.#### | #.####1.000 | | #.#### | 0.5000 |
| 1.0000 | #.#### | #.#### | #.#### | −1.0000 | #.#### |
| −0.9000 | #.#### | #.#### | #.#### | 1.0000 | #.#### |
| #.#### | #.#### | #.#### | #.#### | −1.000 | 0.5000 |

HIDDEN 1 (13 NEURONS)-HIDDEN 2 (5 NEURONS)

| | | | | | | | | | | | | | |
|---|---|---|---|---|---|---|---|---|---|---|---|---|---|
| 1.0000 | #.#### | #.#### | #.#### | #.#### | #.#### | #.#### | #.#### | #.#### | #.#### | #.#### | #.#### | #.#### | 1.0000 |
| #.#### | 1.0000 | #.#### | #.#### | 1.0000 | #.#### | #.#### | 1.0000 | #.#### | #.#### | 1.0000 | #.#### | #.#### | 1.0000 |
| #.#### | #.#### | 1.0000 | #.#### | #.#### | 1.0000 | #.#### | #.#### | 1.0000 | #.#### | #.#### | 1.0000 | #.#### | 1.0000 |
| #.#### | #.#### | #.#### | 1.0000 | #.#### | #.#### | 1.0000 | #.#### | #.#### | 1.0000 | #.#### | #.#### | 1.0000 | 1.0000 |
| 1.0000 | 1.0000 | 1.0000 | 1.0000 | 1.0000 | 1.0000 | 1.0000 | 1.0000 | 1.0000 | 1.0000 | 1.0000 | 1.0000 | 1.0000 | 1.0000 |

HIDDEN 2 (5 NEURONS)-OUTPUT (2 NEURONS)

| | | | | | |
|---|---|---|---|---|---|
| 1.0000 | 1.0000 | 1.0000 | 1.0000 | 1.0000 | 1.0000 |
| #.#### | #.#### | #.#### | #.#### | 1.0000 | 1.0000 |

(B)
INPUT (5 NEURONS)-HIDDEN 1 (13 NEURONS)

| X0 | X1 | X2 | X3 | X4 | X5 |
|---|---|---|---|---|---|
| 1.0000 | #.#### | #.#### | #.#### | #.#### | −0.5100 |
| 1.0000 | −1.0000 | #.#### | #.#### | #.#### | #.#### |
| −0.90000 | 1.0000 | #.#### | #.#### | #.#### | #.#### |
| #.#### | −1.0000 | #.#### | #.#### | #.#### | 0.4900 |
| 0.9500 | #.#### | −1.0000 | #.#### | #.#### | #.#### |
| −0.9000 | #.#### | 1.0000 | #.#### | #.#### | #.#### |
| #.#### | #.#### | −1.0000 | #.#### | #.#### | 0.5000 |
| 1.0000 | #.#### | #.#### | −1.0000 | #.#### | #.#### |
| −0.9000 | #.#### | #.#### | 1.0000 | #.#### | #.#### |

APPENDIX A-continued

| #.#### | #.#### | #.#### | -1.0000 | #.#### | 0.5000 |
| 1.0000 | #.#### | #.#### | #.#### | -1.0000 | #.#### |
| -0.9000 | #.#### | #.#### | #.#### | 1.0000 | #.#### |
| #.#### | #.#### | #.#### | #.#### | -1.0000 | 0.5000 |

HIDDEN 1 (13 NEURONS)-HIDDEN 2 (5 NEURONS)

| 1.0000 | #.#### | #.#### | #.#### | #.#### | #.#### | #.#### | #.#### | #.#### | #.#### | #.#### | #.#### | #.#### | -0.0260 |
| #.#### | -0.1884 | #.#### | #.#### | -0.0154 | #.#### | #.#### | -0.0240 | #.#### | #.#### | -0.0236 | #.#### | #.#### | -0.0260 |
| #.#### | #.#### | -0.252 | #.#### | #.#### | -0.0216 | #.#### | #.#### | -0.222 | #.#### | #.#### | -0.0226 | #.#### | -0.0260 |
| #.#### | #.#### | #.#### | -0.0230 | #.#### | #.#### | -0.0196 | #.#### | #.#### | -0.0256 | #.#### | #.#### | -0.0242 | -0.0260 |
| -0.0120 | -0.0120 | 1.0000 | -0.0120 | -0.0120 | 1.0000 | -0.0120 | -0.0120 | 1.0000 | -0.0120 | -0.0120 | 1.0000 | -0.0120 | -0.0120 |

HIDDEN 2 (5-NEURONS)-OUTPUT (2 NEURONS)

| 0.0422 | -0.0004 | 0.0108 | -0.0162 | #.#### | -0.0424 |
| #.#### | #.#### | #.#### | #.#### | 0.0350 | |
| #.#### | #.#### | #.#### | #.#### | 0.0350 | -0.0208 |

We claim:

1. An automated method for digital image processing of a radiographic image comprising the steps of:
   providing a digital radiographic image of a body part having microcalcifications;
   independently, but simultaneously, box-rim filtering and K-nearest neighbor processing the digital radiographic image;
   global thresholding the image resulting from the prior step;
   body part segmenting the globally thresholded image;
   morphological erosion processing of the body part segmented image;
   connected component analysis of the processed image to determine microcalcification candidates; and
   segmenting the provided image into image blocks centered at the microcalcification candidates.

2. The method of claim 1 including the step of processing each image block with feature map generation using sets of radially sampled pixels.

3. The method of claim 2 including the step of using a neural network with five output nodes specifying five distinct classes:
   (1) microcalcifications, (2) bright solitary dots, (3) medium solitary dots, (4) bright fat tissue, and (5) medium fat tissue.

4. The method of claim 3 including the step of using a heuristic decision rule to facilitate classification of true microcalcifications.

5. The method of claim 4 including the step of using an ANN decision tree in conjunction with said heuristic decision rule.

6. The method of claim 5 wherein said steps are implemented by two separate pruned neural network architectures.

7. The method of claim 6 wherein said two neural network architectures are a semi-trainable ANN implementation and a fully-trainable ANN implementation.

* * * * *

UNITED STATES PATENT AND TRADEMARK OFFICE
CERTIFICATE OF CORRECTION

PATENT NO. : 5,857,030
DATED : January 5,1999
INVENTOR(S) : Roger S. Gaborski, et al.

It is certified that error appears in the above-identified patent and that said Letters Patent is hereby corrected as shown below:

On the title page, insert the following Item [60],
Provisional application No. 60/002,527 filed August 18,1995--
Col., line 5, insert the following:
--CROSS REFERENCE TO RELATED APPLICATION
Reference is made to and priority claimed from U.S. Provisional Application Ser. No. 60/002,527, filed aug. 18,1995, entitled entitled Radiologic Images Utilizing Artificial Neural Networks.--

In Appendix A:
--In row 10, column X3, the entry should be --1.000--
--The penultimate line should be deleted under the Heading
 "Hidden 2 (5-Neurons)-Output (2 Neurons)"--

Signed and Sealed this

Twenty-second Day of June, 1999

Attest:

Q. TODD DICKINSON

*Attesting Officer*         *Acting Commissioner of Patents and Trademarks*